Figure 1:
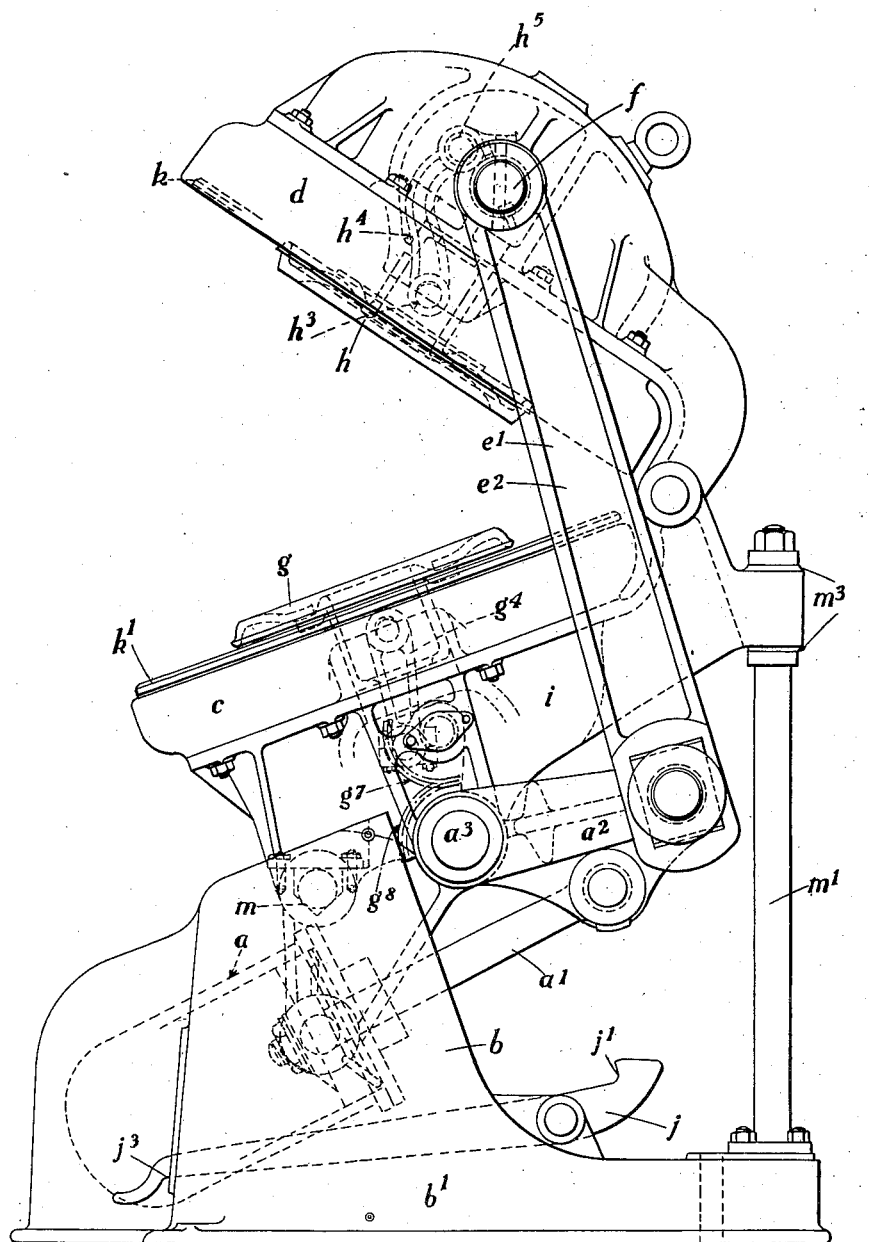

Nov. 3, 1936.   C. MACBETH   2,059,883
VULCANIZING OR SIMILAR PRESS
Original Filed May 11, 1931   2 Sheets-Sheet 1

Nov. 3, 1936.   C. MACBETH   2,059,883
VULCANIZING OR SIMILAR PRESS
Original Filed May 11, 1931    2 Sheets-Sheet 2

Patented Nov. 3, 1936

2,059,883

UNITED STATES PATENT OFFICE 2,059,883

VULCANIZING OR SIMILAR PRESS

Colin Macbeth, Birmingham, England

Application May 11, 1931, Serial No. 536,467. In Great Britain October 28, 1930. Renewed August 20, 1934

8 Claims. (Cl. 18—17)

My invention has reference to vulcanizing or similar presses or molds such as used in the manufacture of pneumatic tire covers and inner tubes and other rubber or similar goods or articles, and pertains in particular to vulcanizing presses or molds of the kind in which power operated toggle mechanism is used both for opening and closing the movable mold member and for clamping or locking the said mold member when closed to the stationary mold member.

My said invention comprises improvements in presses or molds of the kind referred to which provide, in a simple and mechanically-efficient manner, for the power actuation of the toggle-opening, closing and locking mechanism, and also, if desired, for the power actuation or displacement of the bead-rings or like work-clamping expedients of a tire-vulcanizing or similar press during the opening and the closing of the said press.

According to my said invention I propose to provide for the opening and closing of the movable mold member by a power-operated toggle mechanism which is suspended from, or underslung in relation to, the stationary mold member and whose actuating power cylinder is housed below the stationary mold member, the said power cylinder preferably being trunnioned in the front of the bottom-mold support of the press, and having its rim arranged to actuate a toggle-link which is suspended from, or underslung in relation to, the said bottom mold.

Preferably the underslung toggle link is arranged inwards of the cylinder housing and the power-cylinder ram is articulated thereto on a centre below the suspension fulcra of the said links, whilst the connections between the ram-operated link and the hinged mold-member may be made by a pair of levers which are trunnioned to the links on a centre remote from the suspension centre of the latter, and proceed upwardly to trunnions or joints which are located on opposite sides of the mold-member and in a plane parallel with the hinge of the mold. This arrangement provides for the disposition of the whole of the links and levers of the toggle system with their articulation centres in alignment or substantially in alignment when the press is closed and the toggle gear is applying the power-lock to the closed mold-member. The arrangement also permits of the angular movement of the ram-operated link, during opening and closing of the press, in a space below the mold members and inwards of the power-cylinder housing.

An underslung toggle system such as above described may also be adapted for operating the reciprocating bead-rings of a tire-vulcanizing press during the opening and closing of the hinged mold-member, and the frame of the press may so be constructed as to enable either the fitting of bead rings and their operating or control mechanism or of their optional omission.

In the accompanying drawings, I show, by way of example, a press for vulcanizing tire-covers wherein power-operated toggle mechanism is embodied for opening, closing, and locking the hinged mold-member and also for positively displacing the two bead-rings or work-clamping expedients axially in relation to their respective mold-members, for the purpose of stripping the vulcanized work from the said rings and from the hinged and stationary mold-members. This press enables a finished tire-cover to be stripped or freed mechanically from the rings and from the molds without involving the detachment or removal of the said rings from the press, and further enables a tire-cover to be clamped in true concentric relation to the mold matrices by a parallel and equalized clamping action of the bead rings.

Figure 2:
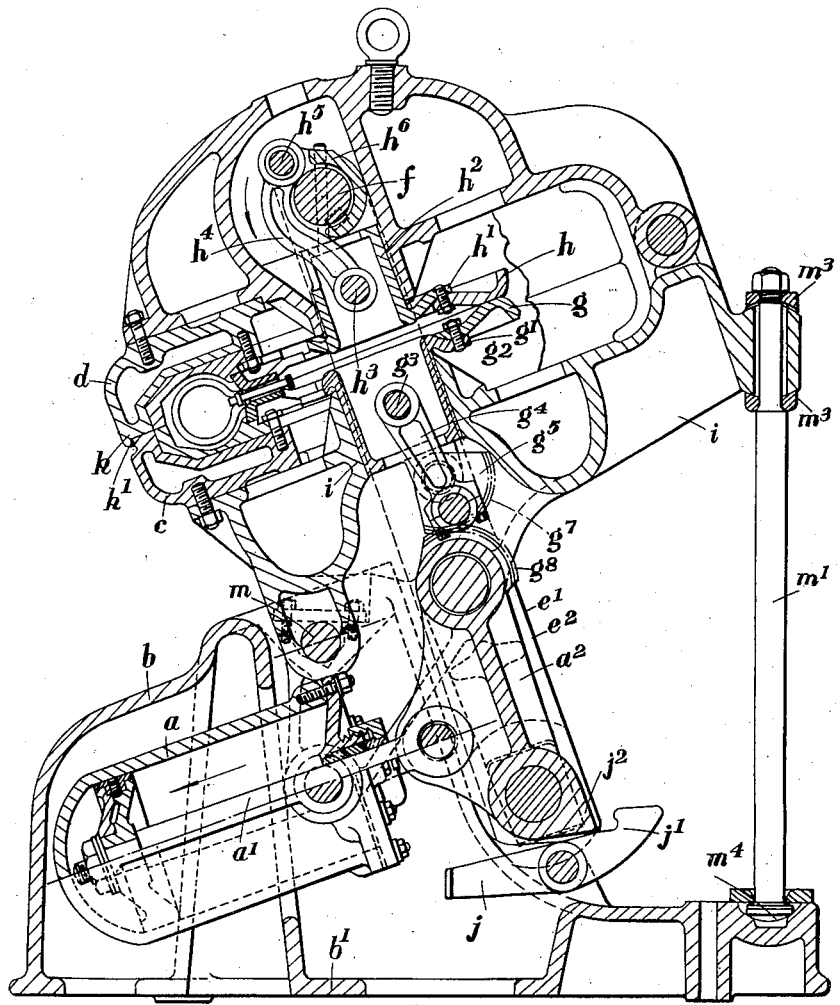

In the said drawings,

Figure 1 is an elevation of the press with the parts in the positions they respectively assume when the hinged mold member is raised, and Figure 2 is a vertical section showing the parts as they are respectively positioned when the hinged mold member is lowered or closed.

In the press as illustrated, a double-acting power cylinder $a$ is housed between and trunnioned to a pair of pedestals $b$ located below the stationary mold-member $c$ and has its ram or piston-rod $a^1$ articulated to a swinging link $a^2$ that is suspended or underslung from a cross-shaft $a^3$ carried in the underframe in a plane intermediate the power-cylinder housing $b$ and the stationary mold-member. This link $a^2$ is also used, as hereinafter described, to control the lower bead-ring $g$ of the press.

The connection between the ram-operated link $a^2$ and the hinged mold-member $d$ is made by a pair of levers $e^1e^2$ which are articulated to the said link on centres remote from the centre of the cross shaft $a^3$ and proceed upwardly, on opposite sides of the press, into connection with a cross-shaft $f$ which is journalled in the upper part of the hinged mold-member and is used to control, also as hereinafter described, the upper bead-ring $h$.

Each of the bead-rings is movable or displaceable axially in its mold-member and when the press is closed, the said rings are clamped in parallel relationship (see Figure 2) and constrained to grip the beads of the cover being vulcanized, whereas when the press is opened and the rings are being angularly separated by the hinging movement of the upper mold-member, both the rings are displaced relatively to their respective mold-members for stripping the finished cover from the rings and molds, and so positioning the said cover as to facilitate its manual removal from the press.

The bead-rings $gh$ are respectively bolted to circular carriers $g^1h^1$, each of which comprises a cylindrical shank $(g^2h^2)$ adapted to slide or reciprocate in a complementary guide or bearing. The shank $h^2$ of the bead-ring carrier $h$ is guided in the centre of the hinged mold-member and has journalled in it, a cross-pin $h^3$ on which is fulcrumed, one end of a link $h^4$, whose other end is pivoted to a crank-pin $h^5$ carried on a strap $h^6$ that is rigidly secured to the previously-mentioned toggle-shaft $f$ of the hinged mold-member. The outer ends of this toggle-shaft are keyed to the side-levers of the main toggle mechanism, and the arrangement is such that when the power-cylinder is brought into action for opening or closing the press, the resultant movement of the toggle side-levers $e^1e^2$ so turns the said cross-shaft $f$ in its bearings that the crank and connecting link $h^5$, $h^4$ displace the bead-ring $h$ relatively to the hinged mold-member during the angular movement of the latter relatively to the stationary mold-member.

The shank of the other bead-ring carrier $g$ is guided in a sleeve formed in the mold-supporting bed $i$ of the underframe, and carries a cross-pin $g^3$ which is connected by a link $g^4$ to a crank $g^5$ that is trunnioned in the said bed $i$ intermediate the said pin $g^3$ and the suspension shaft $a^3$ of the main toggle linkage. The webs or throws $g^7$ of this crank are formed with teeth and constitute toothed quadrants that intermesh with complementary toothed quadrants $g^8$ formed on or keyed to that end of the main toggle-link $a^2$ which fulcrums on the cross-shaft $a^3$.

In the mechanism described, the control gear pertaining to the lower bead-ring carrier constitutes a secondary toggle and is so arranged that, when the main toggle mechanism is operated for opening the press, the said lower bead-ring is raised or elevated in relation to the stationary mold member for stripping the vulcanized tire-cover from the bottom mold and finally locating the said cover in a position convenient for removal from the press. The control gear pertaining to the upper bead-ring carrier constitutes another secondary toggle and is so arranged that, during the collective hinging movement which the upper bead-ring and mold member make for stripping or freeing the top mold off the vulcanized cover, the axial displacement of the said bead-ring relative to the said mold member is in the reverse direction to that in which the lower bead-ring is displaced. That is to say, the upper bead-ring, during the opening action, is displaced away from the toggle shaft $f$ to which it is linked.

But during the closing of the press, both bead-rings are displaced in the opposite sense to their displacement during opening, the lower ring being lowered to its normal or working position in the bottom mold-member (after it has received the next cover to be vulcanized) whilst the upper bead-ring is lifted or retracted in the upper mold-member, and the secondary control toggles are so timed in their respective operations that when the closing of the press is commenced by the action of the main toggle-mechanism, the upper bead-ring is lifted quickly at the start of its movement, whilst the lower bead makes a corresponding quick start in its descending motion, but both rings are decelerated as the closing proceeds. Moreover, the retraction of the upper bead-ring in its mold-member is timed to be almost completed, for bringing the same into its normal or working position in the upper mold-member, before the press finally closes. Thus when the press is closed sufficiently to allow the upper bead-ring to contact with the uncured tire-cover previously located on the bottom bead-ring, the two rings are in approximate parallelism, thereby obviating any unequal or undue pressure being applied to the beads of the cover at the hinge side of the press, such as would tend to distort the said beads or to shift the cover out of its proper concentric position in the said molds.

On the other hand, at the commencement of the opening of the press, when the hinged mold-member is moved relatively slowly under the powerful initial action of the main toggle mechanism, the secondary control toggles give a slower or delayed start to the bead rings but accelerate their movement as the opening proceeds. Thus, and notwithstanding that the bead-rings are in parallelism when the press is closed, the slow or delayed initial action of the secondary toggles allows the hinged mold-member to obtain such a start or lead over the rings that the hinge side of the upper ring is taken clear of the hinge side of the lower ring practically at the commencement of the opening, thus obviating any possibility of the said hinge sides of the rings fouling or jambing.

It will be observed that in presses for the vulcanization of tires and tubes the upper swinging mold section is quite heavy and the toggle mechanism actually operates as a means for controlling the lowering of the section. When the mold is to be opened, however, the weight of the moving section has to be overcome, as also the very considerable force required to "break" the mold or start the opening movement. This is where the powerful action of the toggle which has been provided is particularly effective. The mechanism constitutes exceptionally powerful means for transmitting the opening force of the power-operated cylinder to the hinged mold at the time when the resistance to the movement is most pronounced.

It will also be noted that the opening movement of the toggle is the reverse of the closing movement thereof, and that the movements are confined to the arc immediately adjacent the pivot or axis of the swinging mold section. This has several advantages. As the movement, say in opening, is toward the axis of the swinging section the extent of movement is considerably less for an equivalent degree of elevation of the upper section. By moving the toggle as described, an angular movement of 77° from center will accomplish a raising movement which would be secured by an angular movement of 119° in the opposite direction. This permits of a more economical design and operation of the power actuating means.

A further advantage in swinging the toggle in reverse direction is that it confines the toggle mechanism to the area beneath the rear of the mold, and there is no interference with the mold as would be the case if a crank mechanism were used to swing the upper mold section.

As a safeguard against accidental opening, or as a supplementary provision for resisting high internal pressures in the molds, the press may embody means for positively locking the hinged mold-member in its closed position independently of the clamping or locking action exerted by the power cylinder through the main toggle mechanism. This may consist of a catch or hook-ended lever $j$ which is fulcrumed in the pedestal of the press and arranged so that the hook-end $j^1$ thereof may engage a toe $j^2$ at the lower end of the underslung link of the toggle mechanism when the said link is brought, by power-cylinder action, to a position corresponding to the normal closed position of the press, and the said locking lever may be provided with a pedal $j^3$ so arranged that the lever may be released from the toggle link by lifting of the said pedal. If desired, this auxiliary locking device may be controlled by an independent power-cylinder which retains the catch in engagement with the toggle mechanism so long as the internal air pressure is being maintained on the tire-cover or the like in the press, but automatically releases the said catch when this internal pressure is relieved.

For the sake of convenience in introducing and removing work, the parting line between the hinged and stationary mold-members may be canted at an angle of from 20° to 45° from the horizontal, according to requirements.

The upper and lower mold-members are provided with hinge-pin bearings which may be integral with, or be rigidly bolted to, the said members, but the hinge-pin accommodated in such bearings is not necessarily relied upon to keep the mold faces concentric when the press is closed. On the contrary, the pin may have a degree of slackness in its bearings and the mold-members themselves may be provided with registers that preserve their concentric relation when closed.

For example, and as shown in Figure 2, the body-castings of one of the said mold-members may be formed with a circular peripheral register-flange $k$ of substantial thickness, adapted to seat over or engage in a corresponding annular register $k^1$ in the other casing. Such annular register is of adequate strength and stiffness for resisting distortion under the internal pressures that obtain when the press is in use.

A press having power-actuated means such as herein described for operating and locking the hinged cover may be mounted upon a pedestal which is of tripod construction or has a three-point contact with the floor. The power-cylinder housing may then be located between two of the legs at the front or opening side of the press and these legs may be anchored or bolted to the floor and provided with spheroidal or similar feet that contact with the floor, whilst the third leg which is located at the back of the press and below the cover-hinging side may have no mechanical connection with the floor but may be left free so that its foot may float or shift to enable the structure to accommodate itself without material distortion to the internal stress set up when the press is in operation.

Or alternatively, and for the same purpose, as in the press illustrated in the drawings, the front of the member $i$ of the mold-supporting frame is trunnioned as at $m$ to two pedestals $b$ between which the power-cylinder is housed, whilst the rear or hinge side of the said member $i$ is supported by a vertical leg $m^1$, whose upper end is ball-jointed at $m^3$ to the member $i$ as shown in section in Figure 2, whilst its foot has a similar ball-joint connection at $m^4$ with the bed $b^1$.

Having described my invention, what I claim and desire to secure by Letters Patent is:—

1. A press including relatively movable mold members operated by a toggle mechanism and work clamping ring, wherein the said toggle mechanism comprises a power-operated link and side levers respectively connected to cross-shafts disposed respectively above and below the work-clamping rings in the mold-members, and these shafts are so connected to the complementary rings as to displace the latter relatively to their mold-members during the opening and closing of the press.

2. A press according to the next preceding claim, wherein the means connecting the cross-shafts with the respective work-clamping rings have a toggle-like action.

3. A press according to the second preceding claim, wherein the means connecting the cross-shafts with the respective work-clamping rings are so constructed and arranged that, the said rings are displaced away from their complementary cross-shafts during the opening of the press and are displaced towards their said shafts during closing; the movements of the said rings being progressively accelerated as the opening of the press proceeds, whilst during the closing of the said press, the movements of the said rings are progressively decelerated.

4. A vulcanizing or similar press of the type referred to and having one mold-member hinged to a stationary mold-member, in which power-operated toggle mechanism is used for opening and closing the hinged mold-member and wherein the front or power-cylinder side of the mold-supporting body of the press is trunnioned to a pair of pedestals and the rear of the said body is supported on a leg having ball-joint connections respectively with said mold-supporting member and with the bed that carries the said pedestals.

5. A tire vulcanizing or similar press having a stationary mold-member and a movable mold-member, and toggle mechanism for actuating the movable mold-member, a power cylinder for actuating said toggle mechanism, wherein the toggle mechanism is suspended from and underslung in relation to, the stationary mold-member and its actuating power cylinder is housed below the said stationary mold-member, and wherein a bead-ring or similar work-clamping ring is slidably mounted in each mold-member, and the said rings are, during the opening and closing of the press, displaced relatively to the said mold-members by and under the control of the power-operated toggle mechanism.

6. A vulcanizing press for tires, tubes or the like comprising a stationary mold member and a hinged mold member above the stationary member, a toggle mechanism for raising the hinged member and controlling the gravity closing thereof, the said toggle mechanism comprising a link which is suspended from a fixed fulcrum beneath the stationary mold member and side links pivoted to the aforesaid link and to the hinged mold member, and operating link connected to the first named link intermediate the ends thereof, and a power cylinder for moving said operating link.

7. A vulcanizing press for tires, tubes or the like comprising a stationary mold member and a hinged mold member above the stationary mold member, a toggle mechanism for raising the hinged mold member and controlling the gravity closing thereof, the said toggle mechanism comprising a link suspended from a fixed fulcrum below the stationary member and a link connected to the end of the first named link and the hinged member, and means for applying power to the first named link at a point removed from the fulcrum.

8. In a vulcanizing press for tires, tubes or the like, a stationary mold section and a movable mold section pivoted at one side thereof, an operating toggle for the movable section comprising a link suspended from a point below the stationary section and a link connected to the movable section and the first named link, and a power cylinder for operating the toggle which swings it in reverse directions for the opening and closing movements, the movement in opening being toward the axis of the movable section.

COLIN MACBETH.

CERTIFICATE OF CORRECTION.

Patent No. 2,059,883.                                                November 3, 1936.

COLIN MACBETH.

It is hereby certified that error appears in the printed specification of the above numbered patent requiring correction as follows: Page 1, first column, line 30, for the word "rim" read ram; page 3, first column, line 50, for "casing" read casting; and second column, line 10, claim 1, for "ring" read rings; and that the said Letters Patent should be read with these corrections therein that the same may conform to the record of the case in the Patent Office.

Signed and sealed this 22nd day of December, A. D. 1936.

(Seal)

Henry Van Arsdale
Acting Commissioner of Patents.